United States Patent [19]

Boutaghou et al.

[11] Patent Number: 5,521,778
[45] Date of Patent: May 28, 1996

[54] DISK DRIVE WITH PRIMARY AND SECONDARY ACTUATOR DRIVES

[75] Inventors: Zine-Eddine Boutaghou; Hal H. Ottesen, both of Rochester, Minn.

[73] Assignee: International Business Machines Corporation, Armonk, N.Y.

[21] Appl. No.: 298,509

[22] Filed: Aug. 30, 1994

[51] Int. Cl.$^6$ .................................. G11B 5/55; G11B 5/56
[52] U.S. Cl. ............................................ 360/106; 360/109
[58] Field of Search .................................. 360/106, 109, 360/107

[56] References Cited

U.S. PATENT DOCUMENTS

| | | | |
|---|---|---|---|
| 4,374,402 | 2/1983 | Blessom et al. | 360/104 |
| 4,764,829 | 8/1988 | Makino | 360/106 |
| 4,814,908 | 3/1989 | Schmitz | 360/109 |
| 4,858,040 | 8/1989 | Hazebrouck | 360/78.05 |
| 5,189,578 | 2/1993 | Mori et al. | 360/109 |

FOREIGN PATENT DOCUMENTS

| | | |
|---|---|---|
| 63-2912271 | 11/1988 | Japan . |
| 2226560 | 9/1990 | Japan . |
| 3-17872 | 1/1991 | Japan . |
| 3-69072 | 3/1991 | Japan . |
| 3173979 | 7/1991 | Japan . |
| 4-221476 | 8/1992 | Japan . |
| 5-28683 | 2/1993 | Japan . |

OTHER PUBLICATIONS

IBM Technical Disclosure Bulletin, vol. 31, No. 2, Jul. 1988, pp. 220–221 Head Access Mechanism.

*Primary Examiner*—Robert S. Tupper
*Assistant Examiner*—David D. Davis
*Attorney, Agent, or Firm*—Laurence R. Letson

[57] ABSTRACT

A secondary actuator for increased positional resolution of a read/write head for a DASD is disposed on the distal end of an actuator arm and acts to pivotally move the load beam about the attachment axis. The actuator is comprised of a ring structure on the end of the load beam with the ring structure attached to a central hub through a plurality of spokes. The central hub is fixedly attached to the distal end of the actuator arm for the DASD. Relative motion between the actuator arm and the load beam is accomplished by causing a deflection in one or more of the spokes. The deflection may be caused by piezo-electric transducer elements which are attached to the sides of at least two spokes. Signals sent to the piezo-electric transducer elements will cause bending of the piezoelectric transducer elements and the attached spoke and thus rotationally displace the junction of the spoke and the ring about the central hub. This arrangement permits increasing the fine resolution of the recording tracts on a DASD disk by accommodating the stiction forces which limit the resolution of the actuator and eliminating stiction forces as a factor for the secondary actuator.

20 Claims, 2 Drawing Sheets

DISK DRIVE WITH PRIMARY AND SECONDARY ACTUATOR DRIVES

FIELD OF THE INVENTION

This invention relates to Direct Access Storage Devices (DASD) actuators and more specifically to the actuator arm having a secondary micro-positioning actuator mounted thereon.

BACKGROUND OF THE INVENTION

As Direct Access Storage Devices (DASD) such as disk drives have been reduced in size, the actuators contained within the DASD have been similarly refined to result in higher density recording onto the disks. As the recording density has increased, the actuator positioning capability for read/write head position resolution either has reached or is rapidly approaching a track density limit. The geometry and form factor of the disk drive limit the relative lever arm length, and further density increases are thereby limited unless alternative approaches are implemented.

The typical actuator is formed of a drive armature arm, an actuator arm, and a pivot therebetween. The actuator must be confined within the DASD and be movable with respect to the disk similarly located within the DASD. Any increase in the armature arm length which might serve to increase the resolution of the positioning of the actuator arm is severely limited by the overall size limitations placed on the DASD. Similarly, the travel of the armature arm of the actuator is limited by the structure of the DASD. Presently the DASD disk surfaces and recordability are so improved as to permit a higher recording density. Also, optical recording disks permit very high recording densities, allowing the extremely close placement of the recording tracts relative to each other on the disk of the DASD. With the disks having very fine resolution recording capability, the actuator and the actuator positioning resolution, more particularly, becomes the recording limiting factor.

The actuator positioning resolution is further limited by forces heretofore not considered significant with respect to larger disk drives. Stiction forces exist in the bearing of the actuator and thus limit the reduction of the driving forces which are exerted on the actuator to cause the actuator to move. Once stiction forces are overcome, the bearing permits very low forces to drive the actuator through further movement. With the recording density of typical disk drives in the order of 4,000 to 6,000 tracks per inch (150 tracks per mm), the movement required to move to an adjacent recording track is 0.00025 inches (0.0067 mm).

In order to overcome the stiction forces, a significant magnitude force must be exerted on the armature arm of the actuator. The force exerted must exceed any resistive force in the bearing caused by stiction. Essentially no other forces resisting movement of the actuator exist. Once the stiction force has been overcome and the armature is then moving, the forces for overcoming the dynamic friction of movement are very significantly less than that required to overcome the stiction forces. It is therefore necessary to first overcome the stiction forces and then immediately slow and stop the armature movement so that the distance traversed is minimal and permits the desired recording track density on the disk. Since the force exerted in overcoming the stiction resistance in the bearing or bearing cartridge of the armature is significantly higher than that required to overcome the dynamic friction of the bearing and since the exact moment of overcoming the stiction force cannot be predicted and anticipated, the effect is that the armature will translate rotationally about its pivot axis some minimum distance before the armature arm can be acted upon and stopped. The effect of this is what is known as and referred to as a "jump." One may readily understand that the resolution of the recording positions of the actuator are limited by the magnitude of the jump for a particular design.

In the ongoing effort to reduce the size and particularly the thickness of the DASD, the size of the actuator arm and the thickness of the material from which it is made have been reduced to the point that warpage and deflection become significant design considerations. In addition, some approaches to deflecting the tip of the actuator arm relative to the main portion of the actuator arm structure have included forming serpentine portions which are easily deformed, bending the load beam or distal portion thereof and/or hinging the actuator arm and load beam. These approaches appear to increase the possibility of warpage and undesirable deflection of the load beam and particularly the positioning of the slider as a result of the warpage or deflection. Other approaches to displacing, bending or deforming the load beam of the actuator arm have included the use of piezoelectrically driven displacements of the actuator arm.

The inherent weakening of the load beam or the designing the load beam to possess sufficient flexibility to permit deflection under the influence of piezo-electric elements introduces additional warpage and instability which, in turn, raises the possibility of damage to the disk of the disk drive through undesired and uncontrolled contact between the slider and the disk surface. The weak or weakened portion of the arm is deformed by a piezo-electric transducer (PZT) element which is attached at one point to a more rigid portion of the arm and at a second point to the weakened portion or movable portion. In some of the implementations the PZT element is a bi-morph element which induces bending both of the element and of the segment of the actuator arm to which it is attached, thereby causing the deformation in the actuator arm and the commensurate movement of the slider.

The structures of the prior art are generally used for and are particularly adapted both to tracking of the data track to insure that the head of the slider remains over and centered on the data track of the disk and as well to performing small seeking operations while relying upon the actuator for the positioning of the load beam in the proper position for accessing a particular data track. The control of the piezoelectric transducers is dynamic in nature to perform effective track following thereby making the small adjustments necessary to continuous position the recording head over the data track.

OBJECTS OF THE INVENTION

It is an object of the invention to increase the recording density on a DASD disk.

It another object of the invention to reduce the need to overcome stiction in order to position the recording head over each individual data track on the disk.

It is another object of the invention to improve recording head resolution.

It is still a further object of the invention to position the recording head at intermediate positions between primary head positions as defined by the actuator arm resolution.

The shortcomings of the prior art are overcome and the objects of the invention are accomplished by the present invention and its implementation, a summary of which follows.

SUMMARY OF THE INVENTION

The present invention provides a relatively rigid actuator arm of an actuator within a DASD to insure positional stability. The actuator arm supports a micro-positioning, secondary actuator close to the distal end of the actuator arm. The secondary actuator has a central pivot axis. The secondary actuator is typically formed as a part of and supports the load beam which, in turn, has a slider mounted on the distal end of the load beam.

The secondary actuator includes a central mounting hub and a plurality of spokes which extend generally radially outward from the central mounting hub. The spokes are disposed symmetrically with respect to the long axis of the load beam.

The central mounting hub is attached to the distal end of the actuator arm by conventional techniques such as gluing, swaging, staking or riveting, or other similar attachment techniques where the central mounting hub of the secondary actuator is fixedly attached to the distal end of the actuator arm.

The spokes extend from a center disk which forms the hub. With the spokes extending radially outward, they join a ring structure and thereby position the ring structure relative to the hub. The ring structure is extended on at least one side to form the load beam. The load beam serves to spring bias the slider, disposed at the distal end of the load beam, toward the surface of the disk and also at least partially to resist the effect of the air flowing over the surface of the slider as the disk rotates relative thereto.

The stability of the load beam both around the longitudinal axis of the load beam, extending between the point on the load beam immediately above the read/write head and the center of the hub, as well as in any direction perpendicular to the plane of the load beam, is in large part provided by the arrangement of the spokes extending from the hub to the ring structure.

The spokes extending from the hub may number as few as two or to number four or more. The preferred numbers of the spokes are either three or four, with four being slightly preferable to three. For a two-spoke arrangement, the spokes would be generally aligned with the longitudinal axis of the load beam. For a three-spoke arrangement, the preferred arrangement would be equidistantly spaced apart spokes with one of the spokes extending from the hub to the ring structure lying aligned with the axis of the load beam.

Where four spokes are utilized, the spokes would be divided into pairs, generally lying directly opposite each other across the hub, with one pair of spokes disposed generally aligned with the long axis of the load beam, and the other pair of spokes generally disposed perpendicular to the first pair of spokes. Any number of spokes exceeding four are generally not preferred even though they may be operable. Increasing the number of spokes, while providing some additional stability, also will cause significantly greater resistance to the movement of the load beam relative to the actuator arm under the influence of the PZT elements.

In the arrangements where the spokes number two, three, or four, two of the spokes are provided with PZT elements physically attached preferably by gluing to the sides of the spokes, as viewed from a direction generally perpendicular to the plane of the disk. The PZT elements are preferably bi-morph in nature. Bimorph PZT elements bend when energized by an electrical current. The direction and magnitude of the bend are determined by the polarity of the electrical current and its magnitude, respectively. The bending of a spoke, in response to the bending of the bi-morph PZT element attached on each side of a spoke, may be enhanced by the activation of both of the PZT elements simultaneously. The degree or extent of the bending of the spoke may be influenced and controlled by varying the voltages and the current to each of the separate PZT elements; due to the independent nature of each of the PZT elements, the PZT elements can provide either an additive or a canceling bending stress to the spoke to which the PZT transducers are attached. Further, since two spokes of each of the embodiments are provided with the PZT elements, the bending stresses on the pair of spokes likewise may be either additive or canceling.

As each spoke is bent, the ring rotationally translates relative to the central disk or hub. In order to more precisely define the rotational translation and therefore the position of the magnetic head or other recording head on the end of the load beam, the spokes which are without the PZT elements preferably have reduced cross-sectional portions forming hinges or bending points. The bending of these spokes is concentrated at the hinge and thus is very highly positionally defined. The forces required for bending of the guiding and supporting spokes are reduced by hinging the spokes. The smaller the force required to translate the lead beam relative to the actuator arm, the more precise the positioning of the load beam and hence the slider and read/write head. While from time to time reference may be made to the read/write head as being magnetic in nature, the approach disclosed herein and the technique for controlling position of the read/write head is equally applicable to the read/write head of optical storage devices such as optical disks.

Because bi-morph PZT elements may flex in both directions, displacing the load beam relative to the actuator arm in directions which will displace the read/write head to both sides of the undisplaced location, if the actuator used in the DASD is capable of 4,000 to 6,000 tracks per inch (TPI) resolution, the addition of one deflected position on each side of the normal undeflected position for each track yields a 12,000 to 18,000 TPI recording density. Whenever the PZT elements are used to provide two deflected positions on either side of the nominal, the actuator need only have a 2,400 to 3,600 TPI resolution. This permits the use of less expensive coarser actuators which then may be implemented as a cost-saving technique while the DASD still may attain comparable enhanced recording track densities.

A more complete understanding of the invention may be had by referring to the attached drawings and the detailed description of the invention which follows.

DRAWINGS

DETAILED DESCRIPTION OF THE PREFERRED EMBODIMENT OF THE BEST MODE FOR CARRYING OUT THE INVENTION

Figure 1:
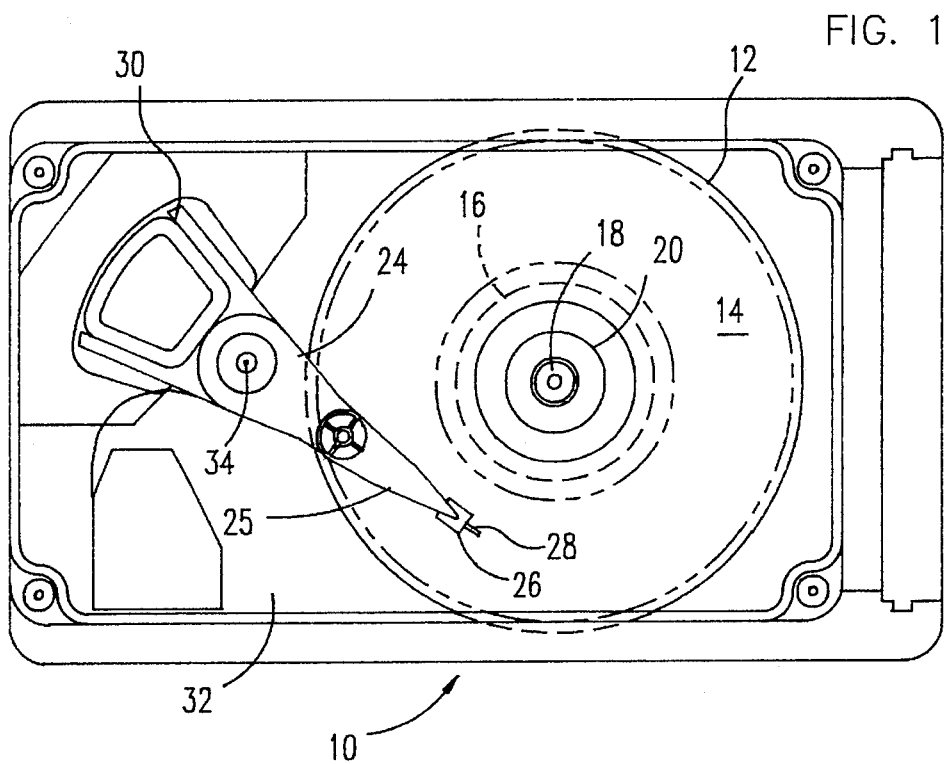
FIG. 1 illustrates a DASD incorporating the subject inventive improvement.

Referring initially to FIG. 1, a DASD 10 incorporating the subject invention is illustrated having a rotatable magnetic or optical disk 12 supported therein. Disk 12 has a recordable surface 14 and is rotationally driven by disk drive motor 16. The disk 12 is supported by a disk spindle bearing 18 and hub 20. Recording surface 14 is accessed across its radial dimension by actuator 21. Actuator 21 is comprised of an actuator arm 24 joined to an armature arm 28 and pivoted at actuator pivot 34. Extending from the distal end 22 of actuator arm 24 is a load beam 25 which supports slider 26 and acts to bias slider 26 against the floating force created by the air passing between slider 26 and recording surface 14 of rotating disk 12. Secondary actuator 30 is disposed between actuator arm 24 and load beam 25.

Figure 2:
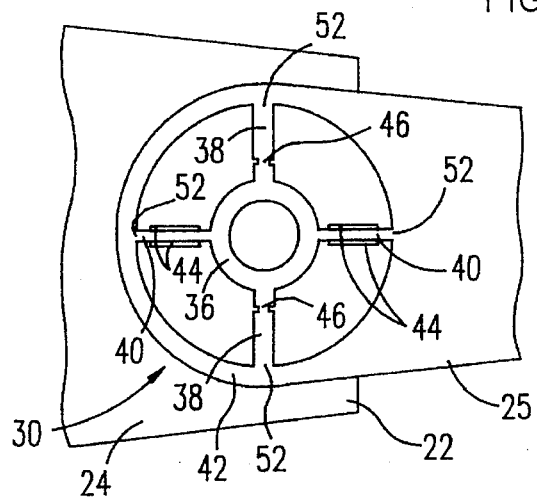
FIG. 2 illustrates the secondary actuator structure incorporating four spokes and piezo-electric transducers attached to two of the spokes.
Figure 3:
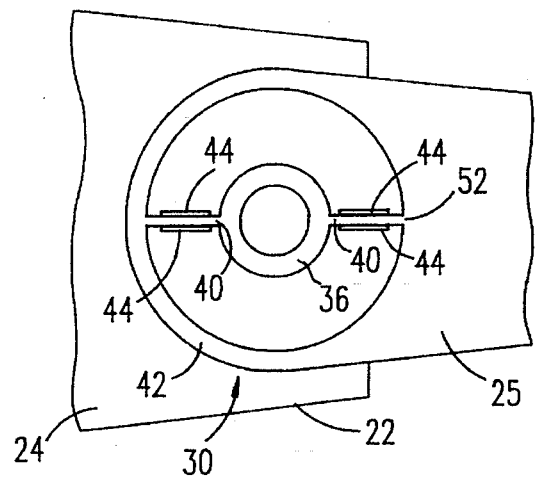
FIG. 3 illustrates the secondary actuator structure incorporating two spokes diametrically disposed across the hub, each spoke having two piezo-electric transducer elements attached to the sides thereof.
Figure 4:
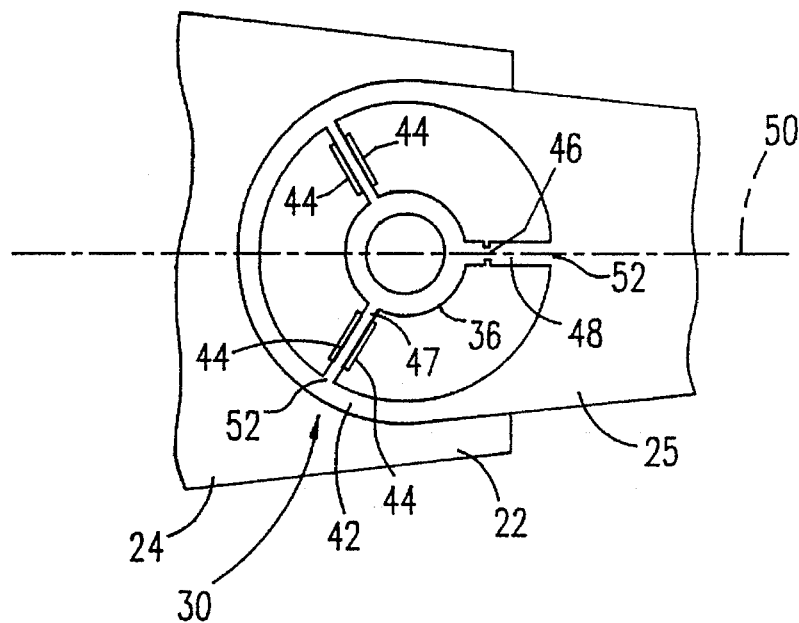
FIG. 4 illustrates the secondary actuator structure incorporating three spokes symmetrically disposed about the long axis of the load beam and whereby two of the spokes are each provided with two piezo-electric transducer elements.

For a more detailed discussion of the structure of the actuator arm 24 and load beam 25 and the micropositioning, secondary actuator 30, reference is now made to FIGS. 2, 3, and 4. While discussion of the secondary actuator 30 will be primarily directed to FIG. 2 the preferred embodiment, discussion of variations from FIG. 2 will be made with respect to FIGS. 3 and 4. Otherwise, a general discussion will not be duplicated.

A small portion of the distal end 22 of actuator arm 24 is illustrated. Overlying and attached to the distal end 22 of actuator arm 24 is secondary actuator 30. Secondary actuator 30 is formed of a central hub 36 which acts as an attachment point for attaching secondary actuator 30 to the distal end 22 of actuator arm 24. The central hub 36 is further provided with a plurality of radially extending spokes 38, 40 divided into two pairs, a first pair of spokes 38 and a second pair of spokes 40. The first pair of spokes 38 serve as stabilizing connections between central hub 36 and ring 42. Ring 42 serves as a connection between the spokes 38, 40 and the load beam 25. Spokes 40 also interconnect hub 36 and ring 42. A pair of piezoelectric transducer (PZT) elements 44 are fixedly attached or adhered to the sides of spokes 40. Spokes 40 act as the driving spokes for the secondary actuator 30. PZT elements 44 are bonded by a glue or adhesive or other suitable attaching technique to the sides of the spokes 40 in order to provide the deforming forces necessary to cause spokes 40 to bend, as will be explained later.

Spokes 38, although serving as stabilizing spokes, are further provided with a reduced cross-sectional area 46 which forms a bendable hinge 46. The reduced cross-sectional area 46 localizes the bending which will result in spokes 38 as well as positionally defines the points about which movement of actuator arm 24 may occur.

With a brief reference to FIG. 3, all the elements of the secondary actuator 30 contained in FIG. 2 are present within the secondary actuator 30 of FIG. 3 with the exception of the stabilizing spokes 38 and hinges 46. In all other regards, FIG. 3 is the same as FIG. 2 and the illustrated elements correspond, having like reference numerals to corresponding elements in FIG. 2. Further explanation of the structure of FIG. 3 is not necessary.

A third embodiment of the secondary actuator 30 is illustrated in FIG. 4. Elements of FIG. 4 bearing like reference numerals to those of FIG. 2 are identical in regard to structure and function and will not be further described; only those elements which are unique to FIG. 4 are further described below.

Stabilizing spoke 48 extends generally coaxially with the long axis 50 of load beam 25 and is provided with a reduced cross-sectional hinge 46 to localize the bending deformation of spoke 48. Symmetrically disposed about axis 50 are bending spokes 47. Bending spokes 47, similar to the second pair of spokes 40 in FIG. 2, carry PZT elements 44.

As one of skill in the art will appreciate, whenever PZT elements 44 are provided with electrical potential and current sufficient to cause their deformation, the fact that these elements 44 are bonded to the sides of the spokes 40, 47 will cause the actual bending of the spokes 40, 47. As the spokes 40, 47 are bent, ring 42 will be caused to make some translation about central hub 36. The stabilizing spokes 38, 48 and particularly hinge 46 will provide constrained guidance to the movement of ring 42 about hub 36.

PZT elements 44 preferably should be bi-morph in nature. Bi-morph elements will cause bending when energized by an electrical potential and current. The extent of bending is dependent upon the electrical parameters of the signal provided, and the direction of bending is a function of the polarity of the electrical signal. Thus, it can be seen that with the appropriate set of electrical signals provided to the PZT elements 44, the elements 44 on any one of the spokes 40, 47 may be caused to bend in the same direction; and since they are bonded and attached to the sides of the spokes 40, 47, the bending effect of each of the bi-morph PZT elements 44 will be additive in causing deformation to the individual spoke 40 or 47 to which elements 44 are attached.

Clearly it will be understood that should the elements 44 on the second spoke 40, 47 in each of the secondary actuators 30 be similarly controlled, the effect may be additive causing more significant pivotal translation of ring 42 about central hub 36. As ring 42 is translated, the stresses created in spokes 40, 47 will be partially transmitted to the spokes 38, 48 respectively. The stress will be concentrated at the hinge 46 formed in each of the spokes 38, 48. The hinge 46 will act to precisely locate the most significant bending of the stabilizing spoke 38, 48 at a precisely defined location relative to central hub 36 and distal end 22 of actuator arm 24.

By reversing the signals previously provided to each of the PZT elements 44, the bending of the PZT elements 44 may be reversed. This will cause the load beam 25 to be moved in the opposite direction through an opposite but analogous distortion of the bending spokes 40, 47 and the stabilizing spokes 38, 48. Upon the termination of the signals supplied to the PZT elements 44, the elements 44 will restore to substantially their original condition, thus returning spokes 40, 47 to their unbent and unstressed condition. In the event that hysteresis occurs, a small reverse polarity signal provided to elements 44 will positively restore spokes 40 and 47 to their undeflected condition.

PZT elements 44 are particularly useful in this type of an environment since they are capable of creating only limited distortion in spokes 40 and 47. However, with load beam 25 having an arm length of approximately five times the radius of the ring 42, an extremely small deflection of junction 52 of ring 52 and spokes 38, 40 in FIG. 2 and spokes 47 and 48 of FIG. 4 will be multiplied by the relative lever arm lengths of the junction 52 and load beam 25 to provide a much larger displacement of the slider 26, as illustrated in FIG. 5.

Figure 5:
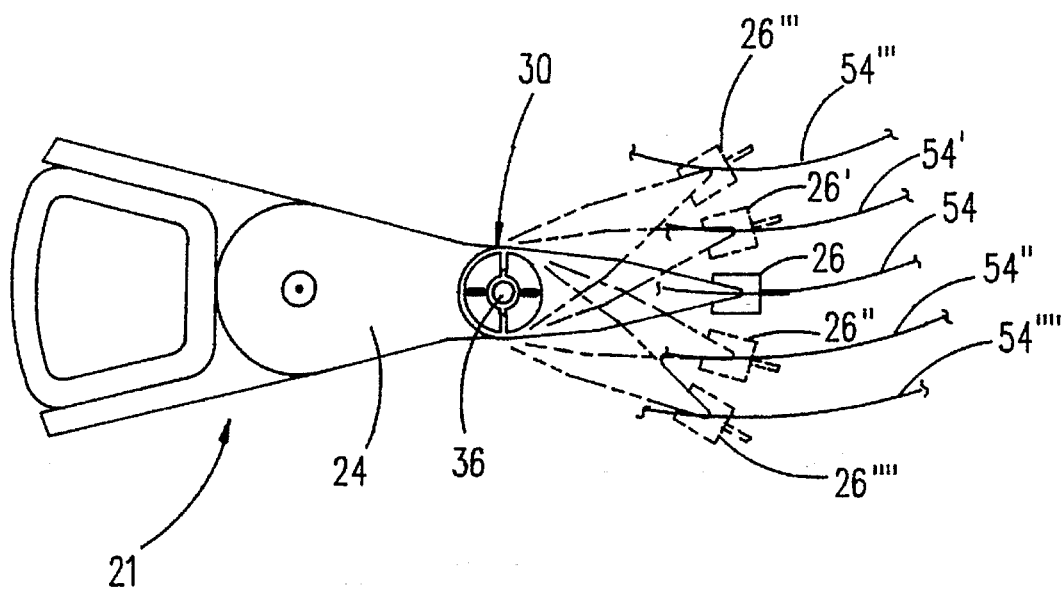
FIG. 5 illustrates in a very significantly exaggerated mode the displacement of the slider with respect to the actuator arm.

Referring now to FIG. 5, it should be understood that the illustration in FIG. 5 is grossly exaggerated in order to provide clarity for purposes of discussion and illustration. Slider position 26 is illustrated for the nominal undeflected track 54. In the instance of an actuator 21 having a 4,000 track per inch (TPI) resolution, if secondary actuator 30 provides the capability of positioning slider 26 at positions 26' and 26", this has the effect of increasing the track density from 4,000 TPI to 12,000 TPI. Thus, a lateral displacement from slider position 26 to slider position 26' or 26" only requires a very fine translation of junction 52. If the relationship of the radial displacement of junction 52 and slider 26 from central hub 36 is a 1:5 relationship, only 0.000017 inches of displacement of junction 52 is required to accomplish a 12,000 TPI recording density. As can be observed, the deflections of spokes of 40 and 47 need be only very small in order to accomplish the displacement of slider 26 to discrete adjacent track 54 positions.

A similar analysis can result in the amount of deflection necessary for junctions 52 in order to provide five tracks of recording for every primary track position of actuator 21. The respective tracks 54, 54', 54", 54"', and 54"" are illustrated for the corresponding positions of the slider 26. The distortions necessary in the spokes 40, 47 to displace junction 52 adequately to effect the displacement of slider 26 in the amounts discussed above are well within the capability of small PZT elements 44.

Once the slider 26 is positioned at the nominal center position over track 54, it can be seen that the actuator 21 need not move from its position in order to position slider 26 over any of the other tracks 54 through 54"" illustrated in FIG. 5. Therefore, the stiction forces in the bearing structure supporting actuator 21 become a non-influencing factor on the placement of the slider over tracks 54' through 54", and extremely fine subdivisions of the minimum resolution of the micro positioning secondary actuator 30 may be accomplished by controlling the electrical signals to the PZT elements 44.

FIG. 2 illustrating the secondary actuator 30 having four spokes is the most stable preferred design; however, the arrangement in FIG. 4 with three spokes is a design which has a high degree of stability as well as a lower force requirement for deflection since one of the stabilizing spokes 38 illustrated in FIG. 2 has been eliminated and the bending forces required to bend that spoke 38 likewise have been eliminated.

FIG. 3 having only two spokes 40 requires smaller bending forces but lacks some of the positional stability which is inherent in the design illustrated in FIGS. 2 and FIG. 4.

Several embodiments of the secondary actuator 30 have been illustrated in showing the operation of the secondary actuator 30 in situations where the secondary actuator has two, three, or four spokes. Additionally, one of skill in the art may find other minor modifications and changes which may be made to the structure as disclosed which will be obvious but which will not remove the apparatus from the scope of the attached claims.

We claim:

1. An actuator for a high data density disk drive comprising:

a primary positioning actuator motor having an electrical coil and at least one cooperating magnet;

an actuator arm pivoted about a pivot axis and attached to said coil for movement with said coil;

said actuator arm extending radially from said pivot axis and having a distal end;

a secondary positioning drive supported on said actuator arm proximate said distal end, said secondary positioning drive having an axis of movement;

a load beam extending from said secondary positioning drive, said load beam having a drive end and a distal end, said drive end defining an opening, and circumscribing said secondary positioning drive;

said secondary positioning drive comprising a central hub attached proximate the distal end of said actuator arm and a first pair of spokes extending from said hub and joining said drive end of said load beam;

piezo-electric transducer elements, each of said elements attached to and on opposed sides of each of said spokes;

wherein said actuator may position said actuator arm in a coarse positioning mode and said secondary positioning drive may position said load beam in fine arcuate positional increments relative to said actuator arm by controlled electrical energizing of said piezo-electric transducer elements causing distortion of said spokes and corresponding movement of said load beam relative to said actuator arm.

2. The actuator of claim 1 further comprising a second pair of spokes extending from said hub and joined to said drive end of said load beam, said second pair of spokes disposed at right angles to said first pair of spokes.

3. The actuator of claim 2 wherein said spokes have a substantially uniform cross-section.

4. The actuator of claim 3 wherein said second pair of spokes is further provided with a localized reduced cross-section, thereby forming a positionally defined hinge.

5. The actuator of claim 4 wherein said opening is substantially circular in shape.

6. The actuator of claim 4 wherein said opening is rectangular in shape.

7. The actuator of claim 4 wherein said opening is square in shape.

8. The actuator of claim 1 wherein said load beam has an axis extending between said pivot axis and said distal end and further comprising an additional single spoke disposed extending along said load beam axis and interconnecting said hub and said drive end of said load beam.

9. The actuator of claim 8 wherein said single spoke and each of said first pair of spokes are equally spaced about said hub.

10. The actuator of claim 8 wherein spokes of said first pair of spokes are symmetrically disposed about said load beam axis.

11. A disk drive for the storage and retrieval of data comprising:

a housing;

a rotatable disk mounted within said housing;

an actuator for positioning a data read/write head at various positions relative to a surface of said rotatable disk, said actuator further comprising:

a primary positioning actuator motor having an electrical coil and at least one cooperating magnet;

an actuator arm pivoted about an axis and attached to said electrical coil for movement with said electrical coil;

said actuator arm extending from said pivot axis and having a distal end;

a secondary positioning drive supported on said actuator arm proximate said distal end, said secondary positioning drive having an axis of movement;

a load beam extending substantially radially from said secondary positioning drive;

said load beam comprising a drive end and a distal end;

said drive end defining an opening, said drive end circumscribing said secondary positioning drive;

said secondary positioning drive comprising a central hub attached proximate said distal end of said actuator arm and at least a first pair of spokes extending m said hub and joining said drive end of said load beam;

a pair of piezo-electric elements attached to, one said element on opposed sides of, each of said spokes;

wherein said actuator may position said actuator arm in a coarse positioning mode and said load beam is positioned in fine arcuate positioning increments relative to said actuator arm by controlled electrically stimulated distortion of said piezoelectric elements, causing distortion of said spokes and corresponding movement of said load beam relative to said axis of movement.

12. The disk drive of claim 11 further comprising a second pair of spokes extending from said hub and joined to said drive end of said load beam, said second pair of spokes disposed substantially perpendicular to said first pair of spokes.

13. The disk drive of claim 12 wherein said spokes have a substantially uniform cross-section.

14. The disk drive of claim 13 wherein said second pair of spokes is further provided with a localized reduced cross-section, thereby forming a positionally defined hinge.

15. The disk drive of claim 14 wherein said opening is substantially circular in shape.

16. The disk drive of claim 14 wherein said opening is rectangular in shape.

17. The disk drive of claim 14 wherein said opening is square in shape.

18. The disk drive of claim 11 wherein said load beam has an axis extending between said pivot axis and said distal end and further comprising an additional single spoke disposed extending along said load beam axis and interconnecting said hub and said drive end of said load beam.

19. The disk drive of claim 18 wherein said single spoke and each of said first pair of spokes are equally spaced about said hub.

20. The disk drive of claim 18 wherein spokes of said first pair of spokes are symmetrically disposed about said load beam.

* * * * *